US011681289B2

(12) United States Patent
Nozaki et al.

(10) Patent No.: US 11,681,289 B2
(45) Date of Patent: Jun. 20, 2023

(54) VEHICLE AND REMOTE OPERATION SYSTEM

(71) Applicants: TOYOTA JIDOSHA KABUSHIKI KAISHA, Toyota (JP); DENSO CORPORATION, Kariya (JP)

(72) Inventors: Yosuke Nozaki, Toyota (JP); Tatsuya Matsunami, Nisshin (JP); Takashi Hayashi, Aichi-gun (JP); Tomoya Makino, Kariya (JP); Yohei Tanigawa, Toyota (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 332 days.

(21) Appl. No.: 17/029,420

(22) Filed: Sep. 23, 2020

(65) Prior Publication Data

US 2021/0109518 A1 Apr. 15, 2021

(30) Foreign Application Priority Data

Oct. 15, 2019 (JP) .............................. JP2019-188833

(51) Int. Cl.
*G05D 1/00* (2006.01)
*B60W 40/08* (2012.01)
*G06V 20/56* (2022.01)

(52) U.S. Cl.
CPC ........... *G05D 1/0038* (2013.01); *B60W 40/08* (2013.01); *G05D 1/0022* (2013.01); *G06V 20/56* (2022.01); *B60W 2540/01* (2020.02); *B60W 2556/45* (2020.02)

(58) Field of Classification Search
CPC .... G05D 1/0038; G05D 1/0022; G06V 20/56; B60W 40/08; B60W 2540/01; B60W 2556/45
See application file for complete search history.

(56) References Cited

U.S. PATENT DOCUMENTS

| 2018/0178808 | A1* | 6/2018 | Zhao | B60K 28/066 |
| 2019/0147274 | A1* | 5/2019 | Tanaka | G06V 40/168 |
| | | | | 701/36 |
| 2019/0212732 | A1 | 7/2019 | Takanashi et al. | |
| 2019/0339696 | A1* | 11/2019 | Mori | G05D 1/0038 |
| 2021/0107526 | A1* | 4/2021 | Nozaki | G08C 17/02 |

FOREIGN PATENT DOCUMENTS

| JP | 2017-163253 A | 9/2017 |
| WO | 2018037945 A1 | 3/2018 |
| WO | 2019180700 A1 | 9/2019 |
| WO | WO-2020039530 A1 * | 2/2020 |

\* cited by examiner

*Primary Examiner* — Behrang Badii
*Assistant Examiner* — Jay Khandpur
(74) *Attorney, Agent, or Firm* — Oliff PLC

(57) ABSTRACT

A vehicle includes a permission unit configured to permit a remote operation using a remote operation device outside the vehicle, a transmission unit configured to transmit, to the remote operation device, information on surroundings of the subject vehicle acquired from sensors, a receiving unit configured to receive a remote operation signal that is input by an operator outside the vehicle via the remote operation device, a travel control unit configured to remotely drive the vehicle based on the remote operation signal, and a replacement reception unit configured to, while the vehicle is remotely driven, receive an instruction from an occupant to replace the operator.

14 Claims, 7 Drawing Sheets

VEHICLE AND REMOTE OPERATION SYSTEM

CROSS-REFERENCE TO RELATED APPLICATION

This application claims priority to Japanese Patent Application No. 2019-188833 filed on Oct. 15, 2019, incorporated herein by reference in its entirety.

BACKGROUND

1. Technical Field

The disclosure relates to a vehicle and a remote operation system.

2. Description of Related Art

Japanese Unexamined Patent Application Publication No. 2017-163253 (JP 2017-163253 A) discloses a remote operation system that changes an operator, who remotely drives a vehicle, under a predetermined condition, such as while the vehicle is stopped.

SUMMARY

However, in JP 2017-163253 A, the operator is replaced due to a situation of the operator but cannot be replaced based on a wish of an occupant of the vehicle.

The objective of the present disclosure is to obtain a vehicle and a remote operation system that can change an operator based on a wish of an occupant.

A vehicle according to a first aspect of the present disclosure includes a permission unit configured to permit a remote operation using a remote operation device outside the vehicle, a transmission unit configured to transmit, to the remote operation device, information on surroundings of the vehicle acquired from sensors, a receiving unit configured to receive a remote operation signal that is input by an operator outside the vehicle via the remote operation device, a travel control unit configured to remotely drive the vehicle based on the remote operation signal, and a replacement reception unit configured to, while the vehicle is remotely driven, receive an instruction to replace the operator from an occupant to replace the operator.

In the vehicle according to the first aspect, the remote operation using the remote operation device is permitted by the permission unit. Accordingly, the vehicle can be remotely operated by the operator outside the vehicle. Further, at this time, since the information on the surroundings of a subject vehicle acquired from the sensors is transmitted to the remote operation device by the transmission unit, the operator can recognize the information on the surroundings of the subject vehicle. Then, the receiving unit of the vehicle receives the remote operation signal that is input by the operator, and the travel control unit remotely drives the vehicle based on the received remote operation signal.

Here, a replacement reception unit configured to receive an instruction to replace the operator is provided. The replacement reception unit receives an instruction from the occupant to replace the operator while the vehicle is remotely driven. In other words, the operator can be replaced based on a wish of the occupant.

In the first aspect, the vehicle may include an operator information display unit configured to display information on a new operator who can replace the operator in a cabin of the vehicle. The replacement reception unit may receive an instruction to replace the operator with a new operator selected by an operation of the occupant from among operators displayed by the operator information display unit.

With the vehicle according to the first aspect, the occupant can wish the replacement with any operator from a list of operators displayed in the cabin of the vehicle by the operator information display unit.

In the first aspect, the vehicle may include a replacement prohibition unit configured to prohibit, after the replacement of the operator, a replacement of the replaced operator within a predetermined time.

With the vehicle according to the first aspect, after the replacement of the operator, the replacement of the replaced operator is prohibited by the replacement prohibition unit within the predetermined time. As such, it is possible to prevent operators from being carelessly replaced successively.

In the first aspect, the replacement reception unit may receive an instruction to replace the operator in a case where the vehicle is stopped or is in a stable traveling state.

With the vehicle according to the first aspect, it is possible to smoothly hand over remote driving by replacing an operator in the case where the subject vehicle is stopped or is in the stable traveling state.

In the first aspect, the vehicle may include a replacement request notification unit configured to notify the occupant of a request for a replacement of the operator in a case where a signal for requesting the replacement is transmitted from the operator via the remote operation device.

With the vehicle according to the first aspect, the operator can request the replacement to the occupant.

In the first aspect, the vehicle may include an operator switching unit configured to, when a predetermined condition is met, switch an operator to another operator.

A remote operation system according to a second aspect of the present disclosure includes the vehicle, and a plurality of remote operation devices that is provided outside the vehicle and configured to remotely operate the vehicle.

With the remote operation system according to the second aspect, the vehicle can be remotely operated based on a remote operation signal transmitted from the operator via the remote operation device. Further, it is possible to replace with remote driving by an operator of another remote operation device.

As described above, with each aspect of the present disclosure, an operator can be replaced based on a wish of an occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
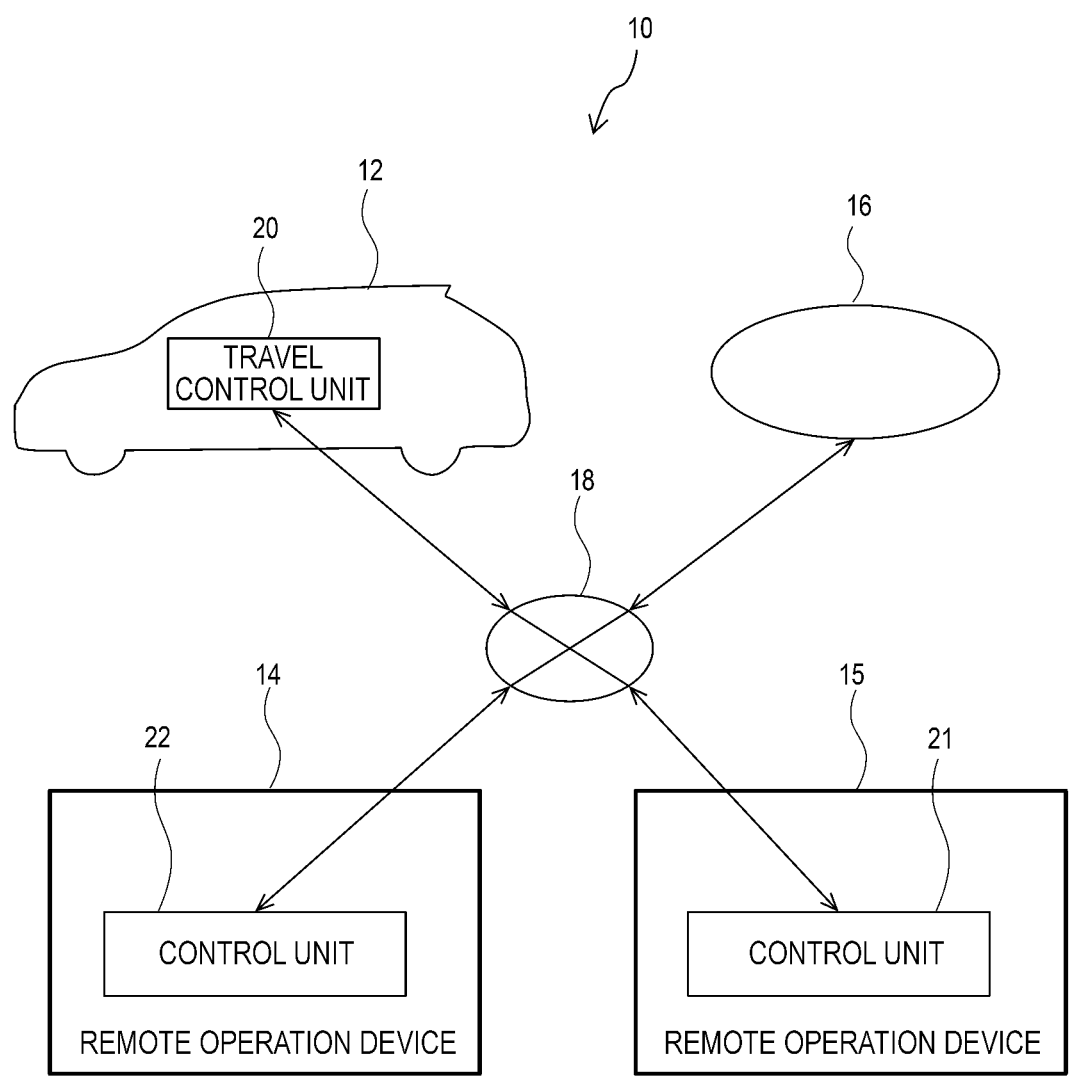
FIG. 1 is a diagram illustrating a schematic configuration of a remote operation system according to an embodiment.

A remote operation system 10 according to an embodiment will be described with reference to the drawings. Dimensional ratios in the drawings are exaggerated for convenience of description, and may differ from actual dimensional ratios.

As illustrated in FIG. 1, the remote operation system 10 includes a vehicle 12, a remote operation device 14, a remote operation device 15, and a server 16. Further, the vehicle 12, the remote operation device 14, the remote operation device 15, and the server 16 are connected via a predetermined network 18.

The vehicle 12 according to the present embodiment includes a travel control unit 20. Moreover, the vehicle 12 is configured to be switchable between a manual driving mode and a remote driving mode. In the manual driving mode, the vehicle 12 travels by an operation of an occupant (driver) of the vehicle 12. On the other hand, in the remote driving mode, the vehicle 12 travels by the travel control unit 20 based on a remote operation signal input from the remote operation device 14 or the remote operation device 15.

The remote operation device 14 and the remote operation device 15 are provided outside the vehicle 12, and are configured to transmit a remote operation signal input by an operator to the vehicle 12 via the network 18. Further, the remote operation device 14 is provided with a control unit 22, and the remote operation device 15 is provided with a control unit 21. Further, each of the remote operation device 14 and the remote operation device 15 includes an input device 68 via which operators input the remote operation signal (see FIG. 3).

The server 16 accumulates information on operators in a predetermined region. For example, information on a list of operators who can remotely operate a vehicle, information on a travel history of each operator, and the like, are accumulated in the server 16, and are updated regularly.

Hardware Configuration of Vehicle 12

Figure 2:
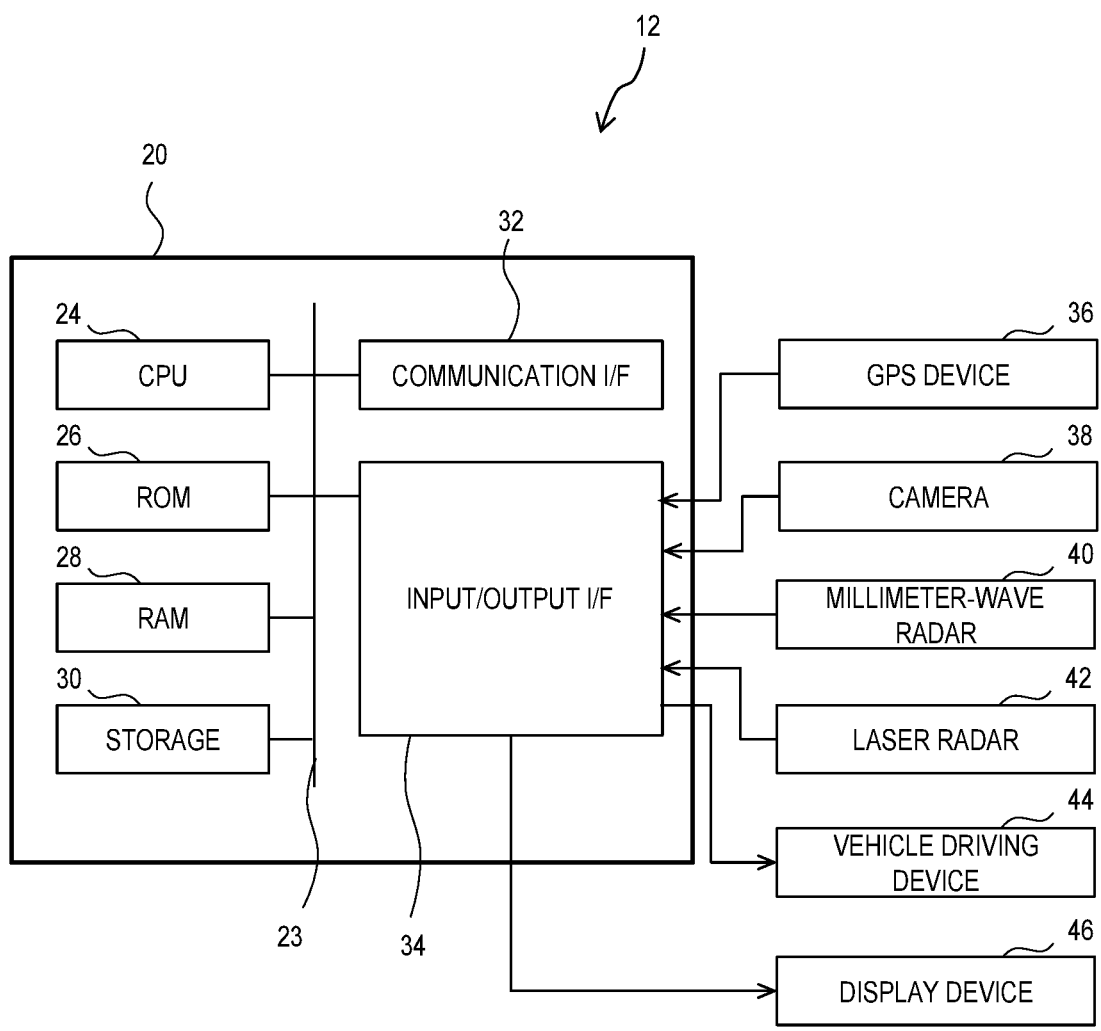
FIG. 2 is a block diagram illustrating a hardware configuration of a vehicle.

FIG. 2 is a block diagram illustrating a hardware configuration of the vehicle 12. As illustrated in FIG. 2, the travel control unit 20 of the vehicle 12 includes a central processing unit (CPU; a processor) 24, a read-only memory (ROM) 26, a random access memory (RAM) 28, a storage 30, a communication interface 32, and an input/output interface 34. The above components are communicably connected to each other via buses 23.

The CPU 24 is a central processing unit, and executes various programs and controls each unit. In other words, the CPU 24 reads a program from the ROM 26 or the storage 30, and executes the program using the RAM 28 as a work area. The CPU 24 controls the respective components and executes various arithmetic processes according to a program recorded in the ROM 26 or the storage 30.

The ROM 26 stores various programs and various pieces of data. The RAM 28 temporarily stores a program or data as a work area. The storage 30 is composed of a hard disk drive (HDD) or a solid state drive (SSD), and stores various programs including an operating system and various pieces of data. In the present embodiment, the ROM 26 or the storage 30 stores various programs, such as a remote operation program for causing the vehicle 12 to travel by a remote operation, a replacement reception program for receiving an instruction of a replacement of an operator, and a replacement request program for requesting a replacement from an operator.

The communication interface 32 is an interface through which the vehicle 12 communicates with the remote operation devices 14, 15, the server 16, and other devices, and, as standards thereof, for example, Ethernet®, FDDI, and Wi-Fi®, are used.

The input/output interface 34 is connected to a global positioning system (GPS) device 36, a camera 38, a millimeter-wave radar 40, a laser radar 42, a vehicle driving device 44, and a display device 46. The GPS device 36 receives GPS signals from a plurality of GPS satellites and measures the position of the subject vehicle. Positioning accuracy of the GPS device 36 improves as the number of GPS signals that can be received increases.

A plurality of cameras 38 is provided on the outer plate of the vehicle 12 and captures an image of the surroundings of the vehicle 12. The millimeter-wave radar 40 measures a reflected wave of an emitted radio wave, and detects an obstacle of the surroundings of the vehicle 12. The laser radar 42 scans a laser light, measures a reflected light of the laser light, and detects an obstacle of the surroundings of the vehicle 12.

The vehicle driving device 44 drives the vehicle 12 based on a signal input by the occupant or the operator. In other words, the vehicle driving device 44 includes a steering actuator, an accelerator actuator, and a brake actuator.

The display device 46 displays various pieces of information to the occupant. The display device 46 includes a monitor, and the like. Alternatively, the display device 46 may be composed of a plurality of monitors, or may include, for example, a central display provided at the center of an instrument panel in the vehicle width direction and a head-up display (HUD) provided in front of the driver's seat.

Hardware Configuration of Remote Operation Device 14

Figure 3:
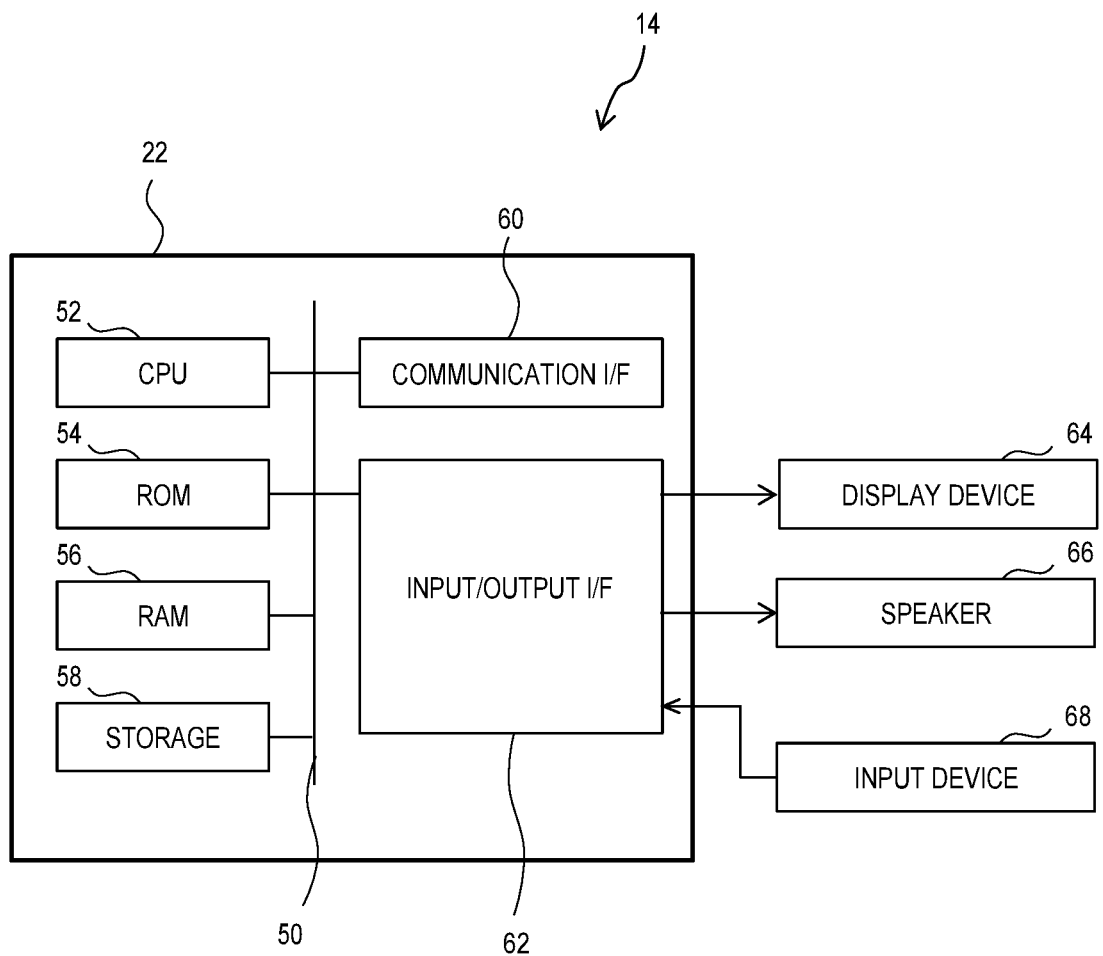
FIG. 3 is a block diagram illustrating a hardware configuration of a remote operation device.

FIG. 3 is a block diagram illustrating a hardware configuration of the remote operation device 14. As illustrated in FIG. 3, the control unit 22 of the remote operation device 14 includes a CPU 52, a ROM 54, a RAM 56, a storage 58, a communication interface 60, and an input/output interface 62. The above components are communicably connected to each other via buses 50. Since the remote operation device 15 has the same hardware configuration as that of the remote operation device 14, only the remote operation device 14 will be described below, and description of the remote operation device 15 will be appropriately omitted.

The CPU 52 is a central processing unit, and executes various programs and controls each unit. In other words, the CPU 52 reads a program from the ROM 54 or the storage 58, and executes the program using the RAM 56 as a work area. The CPU 52 controls the respective components and executes various arithmetic processes according to a program recorded in the ROM 54 or the storage 58.

The ROM 54 stores various programs and various pieces of data. The RAM 56 temporarily stores a program or data as a work area. The storage 58 is composed of an HDD or an SSD, and stores various programs including an operating system and various pieces of data.

The communication interface 60 is an interface through which the remote operation device 14 communicates with the vehicle 12, the server 16, and other devices, and as standards thereof, for example, Ethernet®, FDDI, and Wi-Fi® are used.

The input/output interface 62 is connected to a display device 64, a speaker 66, the input device 68, and a camera 69. The display device 64 displays video of the surroundings of the vehicle 12 and information on instruments of the vehicle 12 to the operator. The display device 64 includes a monitor, and the like. Alternatively, the display device 64 may be composed of a plurality of monitors.

The speaker 66 outputs voice to the operator, and is used when, for example, the operator communicates with the occupant of the vehicle 12. The input device 68 is a device via which the operator inputs the remote operation signal to the remote operation device 14. As an example of the input device 68, an input device imitating a cockpit of the vehicle 12 can be used. In this case, the operator can remotely operate the vehicle 12 as if he/she drives an actual vehicle.

Alternatively, as another example of the input device, a controller that can be held by an operator and that is provided with a plurality of buttons may be used. Such a controller may have a shape imitating a controller used in a computer game. In this case, an operator with a leg disability can also remotely operate the vehicle 12.

Functional Configuration of Vehicle 12

The vehicle 12 composing the remote operation system 10 implements various functions using the above hardware resources. The functions implemented by the vehicle 12 will be described with reference to FIG. 4.

Figure 4:
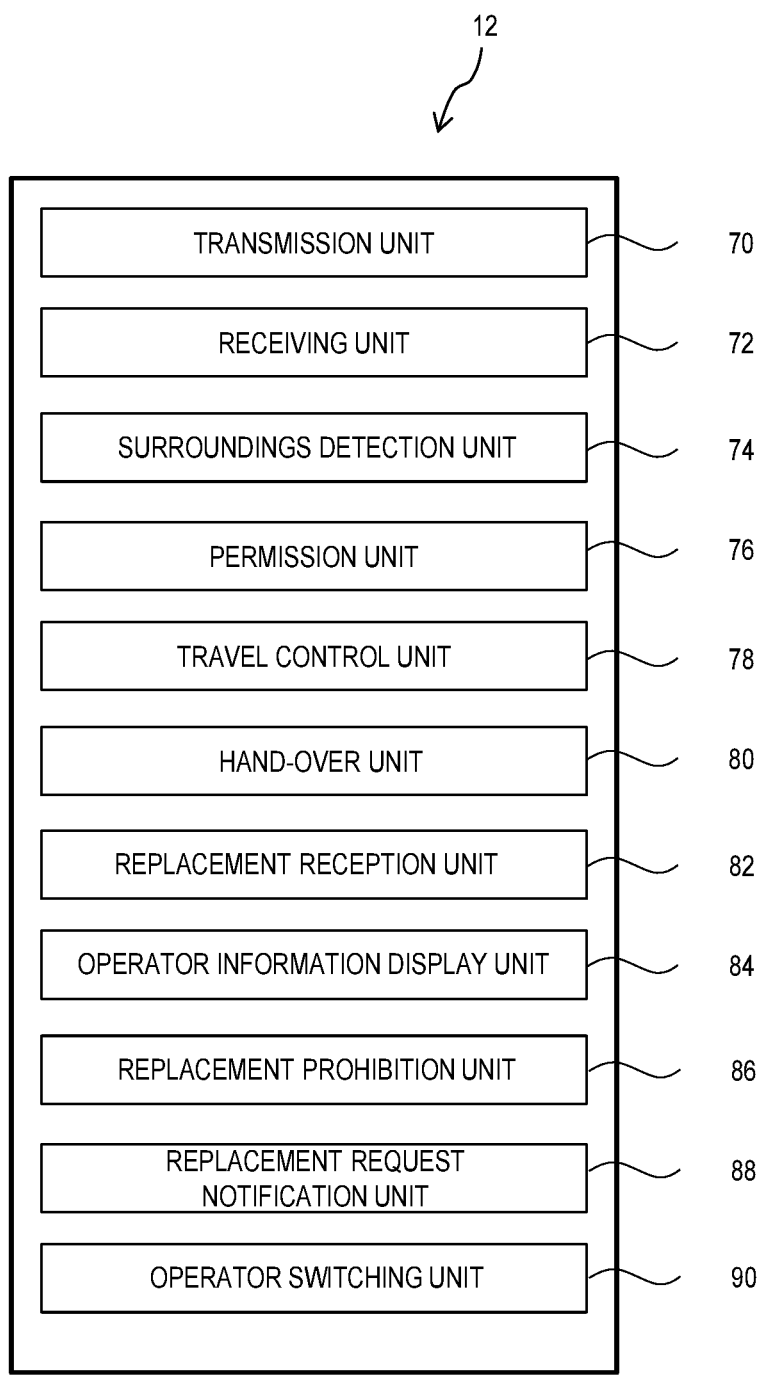
FIG. 4 is a block diagram illustrating an example of a functional configuration of the vehicle.

As illustrated in FIG. 4, the vehicle 12 has a functional configuration including a transmission unit 70, a receiving unit 72, a surroundings detection unit 74, a permission unit 76, a travel control unit 78, a hand-over unit 80, a replacement reception unit 82, an operator information display unit 84, a replacement prohibition unit 86, a replacement request notification unit 88, and an operator switching unit 90. A function of each functional configuration is implemented as the CPU 24 reads and executes a program stored in the ROM 26 or the storage 30.

The transmission unit 70 transmits, to the remote operation device 14, information on the surroundings of the vehicle 12, and the like, acquired from sensors, such as the camera 38, the millimeter-wave radar 40, and the laser radar 42. In addition to the above information, the transmission unit 70 may transmit information, such as speed, a current position, and a scheduled travel route of the vehicle 12.

The receiving unit 72 receives the remote operation signal that is input to the remote operation device 14 by the operator via the input device 68. Examples of the remote operation signal according to the present embodiment may be signals including data on acceleration/deceleration that is input to the remote operation device 14, data on steering that is input to the remote operation device 14, and information on the line of sight of the operator.

The surroundings detection unit 74 detects the surroundings of the vehicle 12 based on the information acquired from the sensors, such as the camera 38, the millimeter-wave radar 40, and the laser radar 42. When a predetermined condition is met, the permission unit 76 permits the remote operation using the remote operation device 14 outside the vehicle.

The travel control unit 78 causes the vehicle 12 to travel based on the remote operation signal received by the receiving unit 72. In other words, the travel control unit 78 causes the vehicle 12 to travel by controlling the vehicle driving device 44 based on the remote operation signal.

The hand-over unit 80 hands the driving from the driver over to the operator. In other words, the hand-over unit 80 switches a driving mode from the manual driving mode, in which the vehicle 12 travels by the driver based on driving data, to the remote driving mode, in which the vehicle 12 travels based on the remote operation signal. In the remote driving mode, the vehicle 12 travels by the travel control unit 78 based on the remote operation signal received by the receiving unit 72.

While the vehicle 12 is remotely driven, the replacement reception unit 82 receives an instruction from the occupant to replace the operator. In other words, the replacement reception unit 82 receives an instruction of a replacement of the operator by the operation of the occupant. The replacement reception unit 82 according to the present embodiment is configured to receive an instruction to replace the operator, for example, in a case where the vehicle 12 is stopped or is in a stable traveling state.

The operator information display unit 84 displays the information on an operator who can replace the current operator in a cabin of the vehicle. In other words, the operator information display unit 84 displays the information on an operator who can replace the current operator on the monitor, and the like, of the display device 46 in the cabin of the vehicle. Then, the replacement reception unit 82 receives an instruction to replace the current operator with a new operator selected by the operation of the occupant from among operators displayed on the monitor, and the like, of the display device 46.

After the replacement of the operator, the replacement prohibition unit 86 prohibits a replacement of the replaced operator within a predetermined time. The prohibition applies not only to when the operator is replaced through the replacement reception unit 82 but also when the operator is replaced due to a situation of the operator. In other words, even when the operator has been replaced not through the replacement reception unit 82, the replacement prohibition unit 86 prohibits the replacement of the operator within the predetermined time.

When the operator transmits a signal for requesting the replacement via the remote operation device 14, the replacement request notification unit 88 notifies the occupant of the operator replacement request. For example, when an operator of the remote operation device 14 requests a replacement with an operator of the remote operation device 15, that is, when the operator requests a replacement to the vehicle 12 via the remote operation device 14, the replacement request is transmitted from the operator to the vehicle 12 via the remote operation device 14. Then, the replacement request notification unit 88 notifies the occupant that there has been a replacement request from the operator of the remote operation device 14. The occupant is notified while, for example, the vehicle 12 is stopped.

The operator switching unit 90 switches the operators of remote driving. For example, the operator switching unit 90 switches from the remote driving mode, in which the vehicle 12 travels based on the remote operation signal of the remote operation device 14, to the remote driving mode, in which the vehicle 12 travels based on the remote operation signal of the remote operation device 15. At this time, the operator of the remote driving can be switched on a premise that the predetermined condition is met. The predetermined condition is a condition under which the remote driving can be safely handed over when, for example, the operation synchronization rate between the operators is equal to or greater than a predetermined value.

Functional Configuration of Remote Operation Device 14

The remote operation device 14 composing the remote operation system 10 implements various functions using the above hardware resources. The functions implemented by the remote operation device 14 will be described with reference to FIG. 5. Each function is implemented as the CPU 52 reads and executes a program stored in the ROM 54 or the storage 58.

Figure 5:
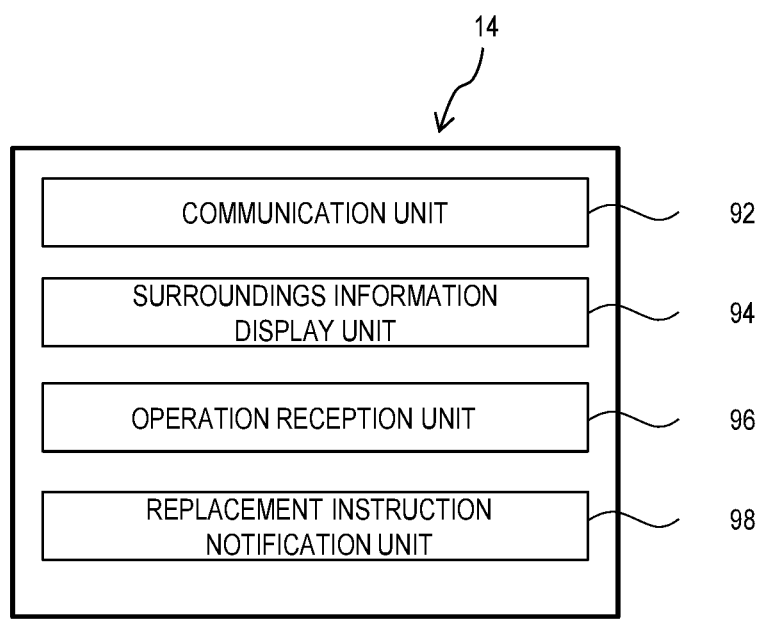
FIG. 5 is a block diagram illustrating an example of a functional configuration of the remote operation device.

As illustrated in FIG. 5, the remote operation device 14 has a functional configuration including a communication unit 92, a surroundings information display unit 94, an operation reception unit 96, and a replacement instruction notification unit 98.

The communication unit 92 communicates with the vehicle 12 via the network 18. In other words, the communication unit 92 receives a signal from, or transmits a signal to, the vehicle 12 via the network 18.

The surroundings information display unit 94 displays, on the display device 64, the information on the surroundings of the vehicle 12 transmitted to the remote operation device 14 by the transmission unit 70 of the vehicle 12. Specifically, the surroundings information display unit 94 displays, on the display device 64, for example, information on an obstacle detected by the camera 38, the millimeter-wave radar 40, and the laser radar 42 that are mounted on the vehicle 12.

The operation reception unit 96 receives the remote operation signal input via the input device 68 by the operator. Then, the remote operation signal received by the operation reception unit 96 is transmitted by the communication unit 92 to the vehicle 12 via the network 18.

When the replacement reception unit 82 of the vehicle 12 receives the instruction to replace the operator, the replacement instruction notification unit 98 notifies the operator that there has been a replacement instruction. For example, in a case where the operator of the remote operation device 14 is remotely driving the vehicle 12, when the replacement reception unit 82 receives an instruction to replace the operator with the operator of the remote operation device 15, the replacement instruction notification unit 98 notifies the replacement to both the remote operation device 14 and the remote operation device 15. In other words, the replacement instruction notification unit 98 notifies the operator of the remote operation device 14 that there has been a replacement instruction from the occupant. On the other hand, the replacement instruction notification unit 98 notifies the operator of the remote operation device 15 that there is a request for the remote driving from the occupant.

Action

Next, an action according to the present embodiment will be described.

Example of Replacement Reception Processing

Figure 6:
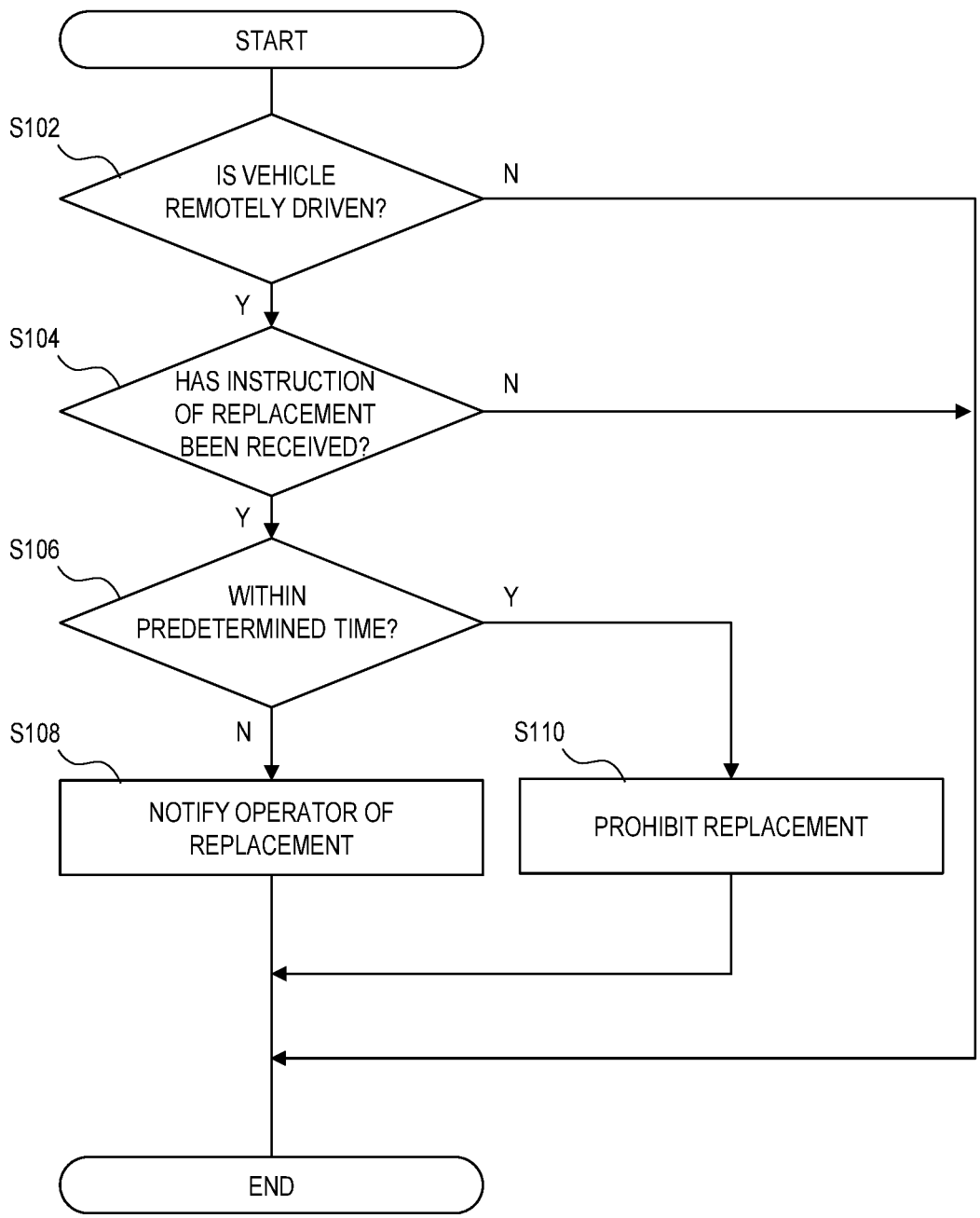
FIG. 6 is a flowchart illustrating an example of a flow of a replacement reception processing.

FIG. 6 is a flowchart illustrating an example of a flow of a replacement reception processing by the remote operation system 10. The replacement reception processing is executed as the CPU 24 reads the replacement reception program from the ROM 26 or the storage 30, and deploys and executes the program in the RAM 28. The replacement reception processing is periodically executed at predetermined time intervals. Further, in the following flowchart, as an example, a case will be described in which the instruction of the replacement with the operator of the remote operation device 15 is received while the vehicle 12 is remotely driven by the remote operation device 14.

As illustrated in FIG. 6, in step S102, the CPU 24 determines whether the vehicle 12 is remotely driven. When the hand-over unit 80 has handed the driving mode from the manual driving mode, in which the vehicle 12 travels by the driver based on the driving data, over to the remote driving mode, in which the vehicle 12 travels based on the remote operation signal of the remote operation device 14, the CPU 24 determines that the vehicle 12 is remotely driven.

In step S102, when the CPU 24 determines that the vehicle 12 is remotely driven, the process proceeds to step S104. On the other hand, in step S102, when the CPU 24 determines that the vehicle 12 is not remotely driven, that is, the vehicle 12 is in the manual driving mode, the replacement reception processing ends.

In step S104, the CPU 24 determines whether an instruction of a replacement of the operator has been received. In other words, the CPU 24 determines whether the replacement reception unit 82 has received the instruction of the replacement of the operator. In the present embodiment, the occupant selects an operator of the remote operation device 15 based on the information on a new operator who can replace the current operator such that the instruction of the replacement of the operator is received. The information on the new operator is displayed on the display device 46. Then, in step S104, when the CPU 24 determines that the instruction of the replacement of the operator has been received, the process proceeds to step S106. On the other hand, in step S104, when the CPU 24 determines that the instruction of the replacement of the operator has not been received, the replacement reception processing ends.

In step S106, the CPU 24 determines whether the reception of the instruction of the replacement is within the predetermined time. Specifically, in a case where counting time is started after the replacement of the operator and then the replacement reception unit 82 receives the instruction of the replacement of the operator within the predetermined time, the CPU 24 determines that the reception of the instruction of the replacement is within the predetermined time. In a case where the driving is handed from the driver over to the operator of the remote operation device 14 and then the replacement reception unit 82 receives the instruction of the replacement of the operator within the predetermined time, the CPU 24 also determines that the reception of the instruction of the replacement is within the predetermined time.

In step S106, when the CPU 24 determines that the reception of the instruction of the replacement is within the predetermined time, the process proceeds to step S110. On the other hand, in step S106, when the CPU 24 determines that the reception of the instruction of the replacement is not within the predetermined time, that is, the predetermined time has elapsed after the replacement of the operator and then the replacement reception unit 82 receives the instruction of the replacement of the operator, the process proceeds to step S108.

In step S110, the CPU 24 prohibits the replacement of the operator. In other words, the CPU 24 causes the replacement prohibition unit 86 to prohibit the instruction to replace the operator from being transmitted to the remote operation device 15. Further, the CPU 24 notifies the occupant that the operator will not be replaced. Thereafter, the replacement reception processing ends.

Meanwhile, in step S108, the CPU 24 notifies the remote operation devices 14, 15 of the replacement of the operator. For example, the CPU 24 notifies the operator of the remote operation device 14 that there has been a replacement instruction from the occupant while notifying the operator of the remote operation device 15 that there is a request for the remote driving from the occupant. Thereafter, the replacement reception processing ends.

In a case where the predetermined condition is met after the remote operation devices 14, 15 are notified of the replacement of the operator, the operator switching unit 90 switches the operators of the remote driving. In addition, in step S110, in a case where the occupant is notified that the operator will not be replaced and then the predetermined time elapses, the CPU 24 may notify the occupant that the replacement of the operator is possible.

Example of Replacement Request Processing

Figure 7:
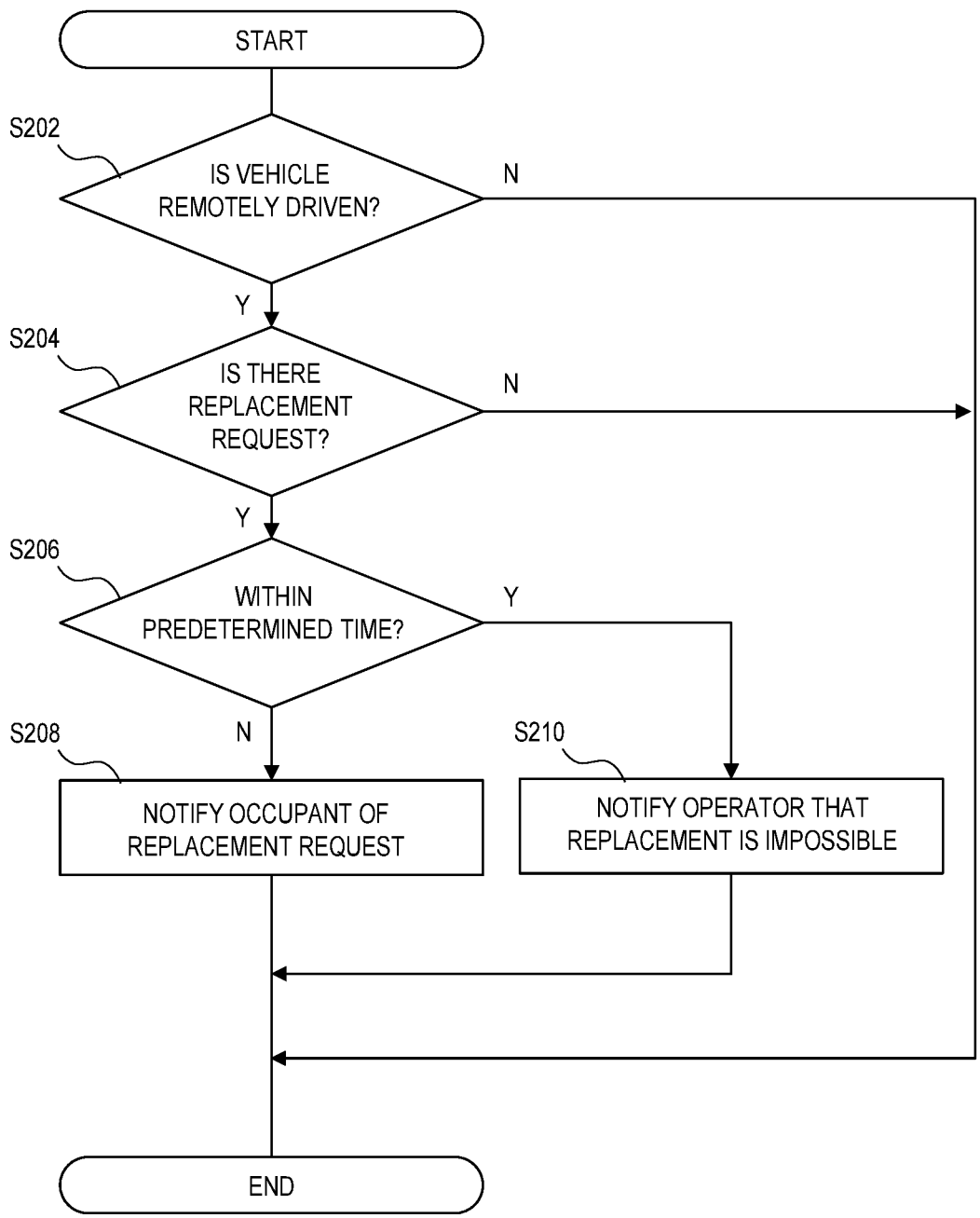
FIG. 7 is a flowchart illustrating an example of a flow of a replacement request processing.

FIG. 7 is a flowchart illustrating an example of a flow of a replacement request processing by the remote operation system 10. The replacement request processing is executed as the CPU 24 reads the replacement request program from the ROM 26 or the storage 30, and deploys and executes the program in the RAM 28. The replacement request processing is periodically executed at predetermined time intervals. Further, in the following flowchart, as an example, a case will be described where there is a replacement request from the operator of the remote operation device 14 while the vehicle 12 is remotely driven by the remote operation device 14.

As illustrated in FIG. 7, in step S202, the CPU 24 determines whether the vehicle 12 is remotely driven. When the hand-over unit 80 has handed the driving mode from the manual driving mode, in which the vehicle 12 travels by the driver based on the driving data, over to the remote driving mode, in which the vehicle 12 travels based on the remote operation signal of the remote operation device 14, the CPU 24 determines that the vehicle 12 is remotely driven.

In step S202, when the CPU 24 determines that the vehicle 12 is remotely driven, the process proceeds to step S204. On the other hand, in step S202, when the CPU 24 determines that the vehicle 12 is not remotely driven, that is, the vehicle 12 is in the manual driving mode, the replacement request processing ends.

In step S204, the CPU 24 determines whether there has been a replacement request from the operator of the remote operation device 14. In other words, when there has been a replacement request from the operator who is remotely driving the vehicle 12 via the remote operation device 14, the CPU 24 determines that there has been a request for the replacement of the operator.

In step S204, when the CPU 24 determines that there has been a request for the replacement of the operator, the process proceeds to step S206. On the other hand, in step S204, when the CPU 24 determines that there has not been a request for the replacement of the operator, the replacement request processing ends.

In step S206, the CPU 24 determines whether the replacement request is within the predetermined time. Specifically, in a case where counting time is started after the replacement of the operator and then there is the request for the replacement of the operator within the predetermined time, the CPU 24 determines that the replacement request is within the predetermined time. In a case where the driving is handed from the driver over to the operator of the remote operation device 14 and then the replacement of the operator is requested within the predetermined time, the CPU 24 also determines that the replacement request is within the predetermined time.

In step S206, when the CPU 24 determines that the replacement request is within the predetermined time, the process proceeds to step S210. On the other hand, in step S206, when the CPU 24 determines that the replacement request is not within the predetermined time, that is, the predetermined time has elapsed after the replacement of the operator and then the replacement of the operator is requested, the process proceeds to step S208.

In step S210, the CPU 24 notifies the operator of the remote operation device 14 that the replacement of the operator is impossible. Specifically, the CPU 24 notifies the operator using a display on the display device 64 of the remote operation device 14 or voice output from the speaker 66. Thereafter, the replacement request processing ends. At this time, the CPU 24 may notify the operator of a time required until the replacement becomes possible.

Meanwhile, in step S208, the CPU 24 notifies the occupant that there has been the replacement request from the operator. Specifically, the replacement request notification unit 88 notifies the occupant of the vehicle 12 of the replacement request, using a display on the display device 46 provided in the vehicle 12 or voice output from a speaker (not shown).

As described above, in the present embodiment, since the replacement reception unit 82 can receive the instruction of the replacement of the operator while the vehicle 12 is remotely driven, it is possible to replace the operator based on a wish of the occupant.

Further, in the present embodiment, the occupant can wish the replacement with any operator from a list of operators displayed in the cabin of the vehicle by the operator information display unit 84.

Moreover, in the present embodiment, after the replacement of the operator, the replacement prohibition unit 86 prohibits the replacement of the replaced operator within the predetermined time. As such, it is possible to prevent operators from being carelessly replaced successively. Particularly, in the present embodiment, since the operator is replaced in the case where the vehicle 12 is stopped or is in the stable traveling state, it is possible to smoothly hand over the remote driving.

Moreover, in the present embodiment, the replacement request notification unit 88 can notify the occupant of the replacement request from the operator.

As above, the embodiment has been described, but it is certain that the embodiment may be implemented in various aspects within a range of the present disclosure not departing from the scope thereof. For example, the above embodiment has a configuration in which the occupant selects any operator and the replacement reception unit 82 receives the instruction of the replacement with the selected operator, but the present disclosure is not limited thereto. In other words, the above embodiment may have a configuration in which the occupant cannot select an operator. In this case, when the replacement reception unit 82 receives the instruction of the replacement of the operator by the operation of the occupant, an operator who will replace may be selected based on information on operators in a predetermined region accumulated in the server 16. Alternatively, the occupant may set a wished condition in advance, and an operator who meets the condition may be selected. Further, a reason for replacing the operator may be transmitted when the instruction of the replacement of the operator is received.

In addition, in the above embodiment, an operator may be set in advance for each region. In this case, an operator who will replace may be notified at a timing when a distance to the boundary of a region becomes shorter than a predetermined distance.

Further, in the above embodiment, after the replacement of the operator, the replacement prohibition unit 86 prohibits the replacement of the operator within the predetermined time, but the present embodiment is not limited thereto. The replacement reception unit 82 may receive the instruction to replace the operator when the predetermined condition is met. For example, the remote driving by the operator may be evaluated using the sensors provided in the vehicle 12, and when the evaluation result is bad, the instruction of the replacement of the operator may be received.

Moreover, in the above embodiment, the replacement reception processing and the replacement request processing are executed as the CPU 24 reads and executes the software (program), but various processors other than the CPU 24 may execute the processing. In this case, examples of the processors include a programmable logic device (PLD) having a circuit configuration changeable after manufacturing a field-programmable gate array (FPGA), or the like, and a dedicated electric circuit having a circuit configuration dedicatedly designed for executing a certain processing, such as an application specific integrated circuit (ASIC), or the like. Further, the replacement reception processing and the replacement request processing may be executed using one of these various processors, or a combination of two or more processors of the same kind or different kinds (for example, a plurality of FPGAs, and a combination of a CPU and an FPGA). In addition, more specifically, a hardware structure of these various processors is an electric circuit in which circuit elements, such as semiconductor elements, are combined.

Moreover, in the above embodiment, the storage 30 and the storage 58 are used as recording units, but the present disclosure is not limited thereto. For example, a recording medium, such as a compact disk (CD), a digital versatile disk (DVD), and a universal serial bus (USB) memory, may be used as the recording units. In this case, various programs are stored in these recording media.

What is claimed is:

1. A vehicle comprising:
a permission unit configured to permit a remote operation using a remote operation device outside the vehicle;
a transmission unit configured to transmit, to the remote operation device, information on surroundings of the vehicle acquired from sensors;
a receiving unit configured to receive a remote operation signal that is input by an operator outside the vehicle via the remote operation device;
a travel control unit configured to remotely drive the vehicle based on the remote operation signal;
a replacement reception unit configured to, while the vehicle is remotely driven, receive an instruction from an occupant to replace the operator; and
a replacement prohibition unit configured to prohibit, after a replacement of the operator, a replacement of the replaced operator within a predetermined time.

2. The vehicle according to claim 1, further comprising:
an operator information display unit configured to display information on a new operator who is able to replace the operator in a cabin of the vehicle, wherein the replacement reception unit is configured to receive an instruction to replace the operator with a new operator selected by an operation of the occupant from among operators displayed by the operator information display unit.

3. The vehicle according to claim 1, wherein the replacement reception unit is configured to receive an instruction to replace the operator in a case where the vehicle is stopped or is in a stable traveling state.

4. The vehicle according to claim 2, wherein the replacement reception unit is configured to receive an instruction to replace the operator in a case where the vehicle is stopped or is in a stable traveling state.

5. The vehicle according to claim 1, further comprising:
a replacement request notification unit configured to notify the occupant of a request for a replacement of the operator in a case where a signal for requesting the replacement is transmitted from the operator via the remote operation device.

6. The vehicle according to claim 2, further comprising:
a replacement request notification unit configured to notify the occupant of a request for a replacement of the operator in a case where a signal for requesting the replacement is transmitted from the operator via a remote operation device.

7. The vehicle according to claim 3, further comprising:
a replacement request notification unit configured to notify an occupant of a request for a replacement of the operator in a case where a signal for requesting the replacement is transmitted from the operator via a remote operation device.

8. The vehicle according to claim 4, further comprising:
a replacement request notification unit configured to notify an occupant of a request for a replacement of the operator in a case where a signal for requesting the replacement is transmitted from the operator via a remote operation device.

9. The vehicle according to claim 1, further comprising an operator switching unit configured to, when a predetermined condition is met, switch an operator to another operator.

10. A remote operation system comprising:
a vehicle including:
a permission unit configured to permit a remote operation using a remote operation device outside the vehicle;
a transmission unit configured to transmit, to the remote operation device, information on surroundings of the vehicle acquired from sensors;
a receiving unit configured to receive a remote operation signal that is input by an operator outside the vehicle via the remote operation device;
a travel control unit configured to remotely drive the vehicle based on the remote operation signal;
a replacement reception unit configured to, while the vehicle is remotely driven, receive an instruction an occupant to replace the operator; and
a replacement prohibition unit configured to prohibit, after a replacement of the operator, a replacement of the replaced operator within a predetermined time; and
a plurality of remote operation devices that is provided outside the vehicle and configured to remotely operate the vehicle.

11. The remote operation system according to claim 10, wherein:
the vehicle further includes an operator information display unit configured to display information on a new operator who is able to replace the operator in a cabin of the vehicle; and
the replacement reception unit is configured to receive an instruction to replace the operator with a new operator selected by an operation of the occupant from among operators displayed by the operator information display unit.

12. The remote operation system according to claim 10, wherein the replacement reception unit is configured to receive an instruction to replace the operator in a case where the vehicle is stopped or is in a stable traveling state.

13. The remote operation system according to claim 10, wherein the vehicle further includes a replacement request notification unit configured to notify the occupant of a request for the replacement of the operator in a case where a signal for requesting the replacement is transmitted from the operator via the remote operation device.

14. The remote operation system according to claim 10, wherein the vehicle further includes an operator switching unit configured to, when a predetermined condition is met, switch an operator to another operator.

* * * * *